(12) United States Patent
Hui (10) Patent No.: US 10,001,025 B2
(45) Date of Patent: Jun. 19, 2018

(54) COMBINED ELECTRICITY, HEAT, AND CHILL GENERATION FOR A RANKINE ENGINE

(71) Applicant: MONARCH POWER CORP, Scottsdale, AZ (US)

(72) Inventor: Joseph Y. Hui, Fountain Hills, AZ (US)

(73) Assignee: MONARCH POWER CORP, Scottsdale, AZ (US)

( * ) Notice: Subject to any disclaimer, the term of this patent is extended or adjusted under 35 U.S.C. 154(b) by 119 days.

(21) Appl. No.: 14/888,084

(22) PCT Filed: Oct. 2, 2015

(86) PCT No.: PCT/US2015/053864
§ 371 (c)(1),
(2) Date: Oct. 29, 2015

(87) PCT Pub. No.: WO2016/054595
PCT Pub. Date: Apr. 7, 2016

(65) Prior Publication Data
US 2016/0258313 A1 Sep. 8, 2016

Related U.S. Application Data

(60) Provisional application No. 62/059,649, filed on Oct. 3, 2014.

(51) Int. Cl.
*F25B 13/00* (2006.01)
*F01D 15/10* (2006.01)
(Continued)

(52) U.S. Cl.
CPC .............. *F01D 15/10* (2013.01); *F01K 5/00* (2013.01); *F25B 9/002* (2013.01); *F25B 9/008* (2013.01); *F25B 9/06* (2013.01); *F25B 27/00* (2013.01); *H02K 9/19* (2013.01); *F25B 2309/06* (2013.01); *F25B 2309/061* (2013.01); *Y02P 80/15* (2015.11)

(58) Field of Classification Search
CPC ............... F25B 13/00; F25B 1/00; F02C 3/30
USPC ............ 62/324.1, 498, 323.1; 60/39.55, 39.6
See application file for complete search history.

(56) References Cited

U.S. PATENT DOCUMENTS

3,196,631 A * 7/1965 Holland .................. F25B 27/00
                                                                    62/238.4
3,355,903 A * 12/1967 La Fleur ................. F25B 9/004
                                                                    417/408
(Continued)

*Primary Examiner* — Melvin Jones
(74) *Attorney, Agent, or Firm* — Von Hellens & Bycer Law; Matthew L. Bycer (57) ABSTRACT

A generator uses a working fluid in a single-cycle Rankine engine for up to three purposes: generation of electricity; generation of hot water from heat exchanger; and generation of chill by the evaporation of liquefied working fluid. The working fluid, which may be carbon dioxide, goes through a single Rankine cycle for both heat engine and heat pump. Instead of using a pump to liquefy the working fluid, the working fluid experiences cryogenic liquefaction method under controlled pressure. The Hui turbine is used for electricity generation. Heat source for the combined heat pump and heat engine could come from concentrated solar power or from burning a fossil fuel.

19 Claims, 3 Drawing Sheets

(51) Int. Cl.
*F25B 27/00* (2006.01)
*F25B 9/00* (2006.01)
*F25B 9/06* (2006.01)
*H02K 9/19* (2006.01)
*F01K 5/00* (2006.01)

(56) References Cited

U.S. PATENT DOCUMENTS 3,686,867 A * 8/1972 Hull .................... F01K 19/08
 60/667
4,177,651 A * 12/1979 McFarland ........... F25B 29/003
 60/671
4,876,856 A * 10/1989 Iishiki .................. F01D 15/005
 60/651

* cited by examiner

COMBINED ELECTRICITY, HEAT, AND CHILL GENERATION FOR A RANKINE ENGINE

CLAIM OF PRIORITY

This application is as national stage filing of the international Application Number PCT/US15/53864 filed Oct. 2, 2015, which in turn claims priority of U.S. Provisional Application Ser. No. 62/059,649 entitled "Combined Rankine cycle heat engine and reversed Rankine cycle heat pump powered by a heat source for joint electricity, heat and chill generation" filed Oct. 3, 2014, the teachings of which are included herein incorporated by reference.

BACKGROUND OF INVENTION

The Thomas Edison model of centralized power generation is outdated. Personal and distributed generation of energy, not just electricity, will replace centralized generation. Co-generation of utilities beyond just electricity to include heat and chill replaces centralized generation of power.

Co-generation allows local and distributed generation of multiple utilities, offering many advantages that centralized generation cannot. First, waste heat from electricity generation is captured. Large and centralized power plant not only wastes the residual heat, it also uses a large amount of water to dissipate that heat for the purpose of condensing steam from as steam turbine.

Distributed co-generation does not require the use of an expensive and often unreliable electric grid, thereby reducing cost and eliminating transmission loss. Distributed co-generation also has the advantage of using energy source that is local, for example by concentrated solar energy. Part of the reason why power utilities are centralized is to avoid the highly undesirable heat, sound, and air pollution of power plants. The location of the power plant must therefore be removed from population centers, thereby requiring a grid to deliver the power generated to where people live.

In places where sunshine is not abundant, natural gas could be used for distributed co-generation of electricity and heat. Such co-generation methods are becoming popular in Europe and Japan. Fossil fuel is burned to generate steam for a steam turbine. The waste heat from combustion, and from spent steam, is then used for space and water heating.

Schemes were proposed for tri-generation of heat, chill, and electricity. The generation of chill is from absorption chilling, such as using the waste heat of combustion and heat engine to evaporate a refrigerant from an absorbent. The refrigerant is subsequently condensed. Chill is produced when the refrigerant is evaporated under reduced pressure.

Thermodynamic cycles are used for many purposes. Refrigeration uses a reversed Rankine cycle in which a liquefied refrigerant is evaporated to create chill. Heat engine uses a Rankine cycle in which an evaporating working fluid is superheated under pressure to generate motion in a heat engine. Latent heat of gas and liquid and heat of condensation can be collected for heating up water. These three purposes can be combined in single cycle.

One way to refrigerate is by using carbon dioxide as refrigerant or working fluid. Carbon dioxide has gained popularity as a refrigerant because it has much less global warming potential than many of the refrigerants used today. Also, carbon dioxide provides a broader range of temperature for pumping heat. It can be used for heating water to boiling. It can also refrigerate at a much lower temperature without freezing.

Another example of a working fluid is water. Steam engines are Rankine cycle heat engines. Water is evaporated as steam. Steam is superheated to a high temperature and pressure to drive a piston. Heat energy is converted into work by the superheated steam pushing against the piston. The exhaust steam must be cooled to condense back into water. Condensed water is heated in an enclosed boiler to repeat the cycle.

Yet another working fluid is ammonia. The boiling point of ammonia at atmospheric pressure is in between the boiling points of water and carbon dioxide. Pressure requirements for liquefaction of ammonia are less than that required for carbon dioxide. The range of operating temperature for the heat pump based on ammonia is less than that for carbon dioxide, but more than that for water.

SUMMARY OF INVENTION

Instead of using a compressor and condenser to liquefy the working fluid, we may use an ordinary heat pump to chill the working fluid. This avoids the need to compress the working fluid directly. This also allows the storage of chill using a large volume of low-cost liquefied working fluids such as water, ammonia, or carbon dioxide. The stored chill can also be used to liquefy the working fluid from the output of the heat engine.

Tri-generation usually uses different cycles and working fluids for chill and electricity generation. The novelty of the present invention is the use of the same working fluid for chill, heat, and electricity generation. This allows control of temperature and pressure parameters to choose the amount of electricity versus chill generation. If the pressure of the working fluid (post turbine) is high, the working fluid can be liquefied at a higher temperature. Less work is produced by the turbine.

If the turbine relieves too much pressure of the working fluid, then the liquefaction of the lowered pressure working fluid must be achieved by chilling provided by another heat pump. Cryogenic liquefaction of the working fluid may also be completed through an independent chiller. Chill could be obtained from the stored liquefied working fluid through evaporation.

The cooling of the working fluid post turbine could be done by heat exchange with a water heater. In the process, the working fluid is cooled before liquefaction. The heat exchange provides hot water as part of a tri-generation scheme.

Another way to force liquefaction at room temperature, while also providing electricity, is to raise the pressure pre-turbine to a much higher level. The pressure post-turbine remains high enough. The pressure drop ratio of the working fluid between the input and output of the turbine remains at a respectable 5 to 10 times.

The pressure of the working fluid is increased by means of heat. Heat energy is converted into work, if electricity is needed, by dropping pressure across the turbine. Heat energy is dissipated to liquefy the working fluid for the purpose of creating chill. A Rankine cycle engine requires the working fluid to be liquefied. A Rankine cycle pump is used to pump liquid into a boiler for evaporation. The work done by the Rankine cycle pump is small because of the smaller volume of liquid compared with its evaporated volume.

Liquefaction of ammonia and carbon dioxide gives out substantial amount of latent heat of condensation. This latent heat can be used to produce hot water. The latent heat can also be used to preheat carbon dioxide before it is heated further by the power source, such as concentrated solar or fossil fuel. Superheated supercritical carbon dioxide at around 1000 degree Kelvin and up to 100 bar pressure can be very efficient for converting heat and pressure energy into work.

A working fluid becomes critical at a specific temperature and pressure. The working fluid becomes supercritical beyond the critical temperature and pressure. Supercritical working fluid does not undergo evaporation. Supercritical fluid behaves like a gas to fill the entire volume of a container.

Supercritical working fluid can be generated without using a boiler to bring the working fluid to boil. The fluid is kept under a pressure higher than that for the working fluid to go critical. Then the fluid goes through a heat exchanger to increase the temperature of the working fluid beyond the temperature for criticality. The working fluid becomes supercritical without boiling.

Supercritical fluid has a high pressure that is advantageous for efficient conversion of heat into work by adiabatic (no heat exchange) expansion of the working fluid.

The Hui turbine allows the high pressure gas to release its pressure gradually. This gradual release of pressure through an adiabatic expansion of the gas reduces entropy generation. Entropy generation reduces the efficiency of conversion of heat into work. A reversible adiabatic expansion of gas is isentropic (constant entropy). Isentropic and adiabatic expansion of gas attains maximum thermodynamic efficiency as prescribed by Carnot.

DETAILED DESCRIPTION

The present invention use a single cycle for a working fluid to provide the three functions of electricity, heat, and chill generation.

Examples of working fluid are listed in the decreasing order of preference. Carbon dioxide is preferred due to its low cost, environmental friendliness compared to prevailing refrigerants, and its much lower boiling point. A low boiling point allows a broader range of pressure to change the boiling point for the purpose of heat pumping. Carbon dioxide is also inert and stable for high temperature operation of the heat engine.

Ammonia is next preferred due to its popularity of use for absorption chilling. Ammonia is easier to liquefy than carbon dioxide under pressure. The use of ammonia for chilling in our tri-generation scheme may not require an external chiller to force liquefaction. Ammonia can be liquefied at 20 bar pressure at a high temperature of 50 degree Celsius. Ammonia however has the disadvantage in that it is combustible under high pressure and when exposed to air. Ammonia is toxic when inhaled. Ammonia has less range for the working fluid to function as both heat engine and heat pump.

Water can also be used as a refrigerant. However, water boils at a high temperature of 100 degree Celsius at one atmospheric pressure. Similar to lithium bromide chillers, the use of water as a refrigerant would require an excessively low pressure for the purpose of chill generation. Water is therefore quite unlikely to be used for our scheme.

Pressure reduction within the turbine, accompanying an adiabatic expansion process, can convert heat into work. Pressure increase post turbine can raise the temperature for liquefaction of the working fluid. One can balance the pressure reduction and pressure increase of these two processes. This balance is a tradeoff of the efficiency of the heat engine versus the efficiency of the heat pump.

Adiabatic expansion of a gas has constant $PV^\gamma$, in which P is the pressure of the gas, V is the volume of the gas, and $\gamma$ is the adiabatic constant. For polyatomic gases such as water, ammonia, and carbon dioxide, we have $\gamma=7/5$.

Adiabatic expansion of a gas reduces the temperature T of the gas. The pressure versus temperature relationship is constant $P^{1-\gamma}T^\gamma$.

In the adiabatic expansion of the gas, pressure is reduced from $P_1$ to $P_2$. Temperature is reduced from $T_1$ to $T_2$. Constant $P^{1-\gamma}T^\gamma$ implies that $$\frac{T_2}{T_1} = \left(\frac{P_1}{P_2}\right)^{(1-\gamma)/\gamma} = \left(\frac{P_1}{P_2}\right)^{-2/7}.$$

Take for example if pressure reduction within the turbine is a factor of $$\left(\frac{P_1}{P_2}\right) = 10,$$

the temperature reduction is a factor of $$\left(\frac{T_2}{T_1}\right) = 0.518.$$

The isentropic adiabatic process has a thermodynamic efficiency of $$\varepsilon = 1 - \left(\frac{T_2}{T_1}\right) = 1 - 0.518 = 48\%.$$

If the process is not isentropic, say with isentropic efficiency of $\iota$, then temperature reduction $T_1-T_2$ is reduced by a factor of $\iota$. The temperature post expansion is $T'_2>T_2$ such that $T_1-T'_2=\iota(T_1-T_2)$.

Thermodynamic efficiency is also reduced by the same factor with $$\varepsilon' = 1 - \left(\frac{T'_2}{T_1}\right) = \iota\varepsilon.$$

The conversion of heat into work corresponds to the temperature drop of the working fluid from the initial temperature $T_1$ to $T'_2$.

The exhaust from the turbine is further cooled by exchanging heat with working fluid prior to being heated by fossil fuel or concentrated solar energy. The pressure is constant at $P_2$. Temperature drops further to $T_3$.

Subsequently the working fluid exhaust yields heat further in a water heating tank. Temperature of the working fluid drops to the ambient temperature of water $T_4$. This heat exchange yields hot water, one of the three tri-generation function.

The cooled working fluid may be liquefied already, depending on the pressure $P_2$ and temperature $T_4$. For example, water is condensed at $P_2=1$ bar and $T_4=100°$ C. Ammonia is condensed at $P_2=10$ bar and $T_4=25°$ C. Carbon dioxide is condensed at $P_2=20$ bar and $T_4=-20°$ C.

Carbon dioxide becomes critical at a temperature of 31° C. and pressure of 74 bars. Beyond that temperature and pressure, carbon dioxide becomes supercritical with no distinction between the liquid and gaseous phases. Supercritical carbon dioxide can be used as working fluid at around 1000K and 100 bar for the Hui turbine.

In order to retain sufficient pressure for liquefaction of carbon dioxide, one may work at a higher pressure of 500 bar. If pressure is relieved to 100 bar post turbine, carbon dioxide could liquefy at room temperature below the critical temperature.

Carbon dioxide is a better working fluid for heat engine than ammonia or steam. Carbon dioxide is much more inert than ammonia. Steam can be corrosive to metal and is abrasive when it condenses. The critical pressure and temperature of water is much higher than that for carbon dioxide. However, ammonia has the advantage that it can be liquefied at room temperature with much lower pressure than that required to liquefy carbon dioxide.

The disclosed invention is: a method of using a heat source for the tri-generation of heat, chill, and electricity with a single cycle of heat engine working fluid that is first used to produce chill, then heated to high temperature to drive a heat turbine, then cooled to yield heat, and finally liquefied to repeat the cycle. Heat is supplied from a heat source, such as a fossil fuel, preferably natural gas, or solar, preferably concentrated solar. The heat is transferred to a refrigerant, preferably carbon dioxide, contained in a closed loop system, preferably to cause supercritical conditions. Heat from the burner is placed under coils containing refrigerant. The refrigerant then preferably returns through the coils towards and past the burner to a generator, such as a turbine, preferably a Hui turbine. The refrigerant may be combined with a gas, such as hydrogen at this point in the closed loop. The heated refrigerant is then directed to a heat engine, the FIREFLY HEAT, and supplied to, preferably through, a tank of substance, such as water, so that the heated refrigerant transfers heat to the substance, preferably water, so as to supply a water heater. Refrigerant then exits the heat engine to be directed to a cooling system, FIREFLY ICE, and into a condenser. The refrigerant in the condenser is acted upon by refrigerant pumped from the condenser into the evaporator, thus chilling the refrigerant in the condenser. If necessary, an optional external chiller is supplied to further chill the refrigerant in the condenser to ensure proper pressure and temperatures are achieved. Once evaporated, the refrigerant is directed to return to be heated. When returning, the refrigerant may be channeled through the heat engine before returning to the heat supply.

The disclosed apparatus of three components that circulates a single cycle of a working mid is described in the following order: a furnace that heats a working fluid to produce work from a heat engine that may be used for electricity generation; a heat exchanger to cooling the working fluid to produce heat, and a chiller where the working fluid is liquefied, stored, and later evaporated to produce chill before returning to the first component for heating.

Figure 1:
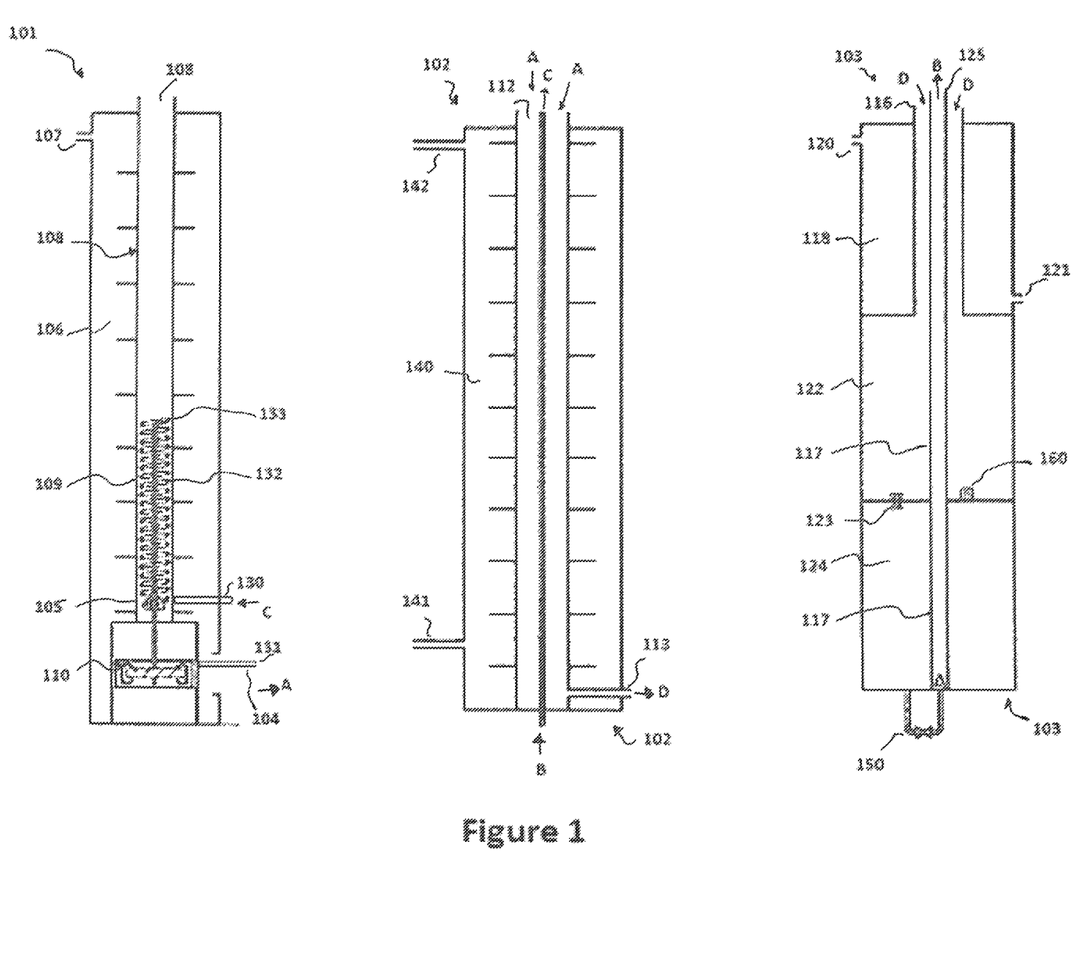
FIG. 1 demonstrates all subsystems of the tri-generation system of an embodiment of the present invention.

Referring now to FIG. 1, based on the use of natural gas, the apparatus is branded as FIREFLY. The three components of the system are the FIREFLY ELECTRIC 101, the FIREFLY HEAT 102, and FIREFLY ICE 103, for the respective purposes of electricity generation, heat collection, and chill production.

FIREFLY ELECTRIC 101 includes an air intake blower and filter 104. The air intake provides oxygen for combustion by the burner 105. The air intake is also heated by the hot air furnace 106, if space heating is needed. Heated air exits at 107, such as to provide space heating.

Combusted air rises in the chimney 108 to heat the working fluid refrigerant, which is referred to here as the preferable embodiment as carbon dioxide, and super-heated carbon dioxide 109. The refrigerant, or super-heated carbon dioxide, is supplied through supply tube 130. The super-heated carbon dioxide is heated within coils 132 positioned above the burner 105. The general flow direction of the refrigerant is preferably away, and preferably upwards, within the coil 132. The refrigerant is then directed back, or down, to and past the burner 105 in directed tube 133. The super-heated carbon dioxide drives the turbine and generator 110 for electricity generation. A preferred turbine generator will include features of the Hui turbine as described and shown in U.S. Pat. No. 9,035,482 to Inventor Hui, herein incorporated by reference. Refrigerant exits from the turbine 110 past blower/filter 104 through forward tube 131.

FIREFLY HEAT 102 is a heat exchanger, or heat engine, supplied with refrigerant from the exhaust of the turbine 110 through exhaust tube 130 to preheat the working fluid 112 prior to superheating in the heating coil 109 in the FIREFLY ELECTRIC 101. The flow of exhaust from the turbine is downward, counter-flowing against the preheated working fluid which flows upward. Refrigerant flows in the direction of A.

The cooled working fluid from the exhaust of the turbine exits the heat exchanger at 113 to be piped to the chiller along D. The working fluid will be liquefied in the chiller called FIREFLY ICE 103.

The exhaust of the turbine also yields it heat to a heated water tank 140 on the outside. Cold water enters and exits the heated water tank 141 at 142, respectively, although both can be used for either entry or exit. After being heated, hot water exits at 142. This hot water is a second source of heat, besides air heated up for space heating for the FIREFLY ELECTRIC 102.

Gaseous working fluid after being cooled by water in the FIREFLY HEAT 102 is further cooled in the FIREFLY ICE 103. The cooled working fluid enters from the top at 116. It is cooled by a small tube on the inside called the evaporator 117. This evaporator contains working fluid that undergoes evaporation at subcritical temperature.

The FIREFLY ICE preferably includes three chambers. The top chamber is a chiller 118 which holds a coolant in the chiller 118 preferably surrounding tubes for the flow of the working fluid. The coolant can be glycol that remains a liquid below the freezing point of water. This coolant enters at the top marked "coolant in" 120 and exits the chiller marked "coolant out" 121. The coolant first cools the entering working fluid 116. The coolant exiting the chiller 118 at 121 can be used for air conditioning or refrigeration purposes.

The middle chamber of the FIREFLY ICE 103 is a working fluid condenser 122. The working fluid is condensed by the chill of the evaporator 117. It is also chilled at the bottom by the liquefied working fluid, preferably within working fluid store 124.

The bottom chamber of the FIREFLY ICE 103 is a store 124 for the liquefied working fluid. Condensed working fluid at the bottom of the working fluid condenser 122 passes through a, preferably one-way, valve 123 to be held inside the store 124. The condensed working fluid is held under moderate to high pressure. Evaporating working fluid from evaporator 117 transfers cooling to the store 124 and thus generates pressure which prevents further evaporation of the working fluid within store 124. Optionally, an external chiller may be joined with the Firefly Ice 103 at entry 160 whereby coils (not shown) can run thought the condenser 122 and/or store 124 to further cool the working fluid in the condenser and/or store. It is anticipated that a second working fluid refrigerant would be used in the external chiller and segregated from the working fluid of the present invention.

When chill and/or work are to be generated, a Rankine engine pump marked "High pressure pump" 150 transfers the liquefied working fluid from the working fluid store 124 into the evaporator 117. The working fluid passes through the nozzle 125. The rising working fluid after the nozzle 125 through route B may be preferably run through the Firefly Heat 102 to absorb heat as it passes by the turbine exhaust 112 and out of the Firefly Heat alone path C to return to the burner through supply tube 130. Along path B→C working fluid temperature rises from cool to hot, and finally superheated as it enters supply tube 130 and runs through coils 132 before entering turbine 110. In an optional embodiment, hydrogen gas may be included within the closed loop holding the working fluid. The hydrogen would be included to maintain high pressure on the turbine and at the exhaust. The hydrogen would preferably maintain the pressure after the turbine 110 to allow supercritical adiabatic characteristics of the working fluid to more efficiently drive turbine 110 to produce electricity. Hydrogen, even more so than Nitrogen, has the special advantages of remaining a gas at very high pressures (such as those to achieve super-criticality of the carbon dioxide at the turbine. Hydrogen is hard to condense, a good conductor of heat, and non-reactive. The hydrogen gas is trapped, or sequestered, within the loop, mostly at the output/exhaust of the turbine, because it will not liquefy to be pumped by the compressor.

Along path A→D working fluid begins hot as it exits Firefly Electric 101, and cools as it passes through Firefly Heat 102, and onto Firefly Ice 103. An alternative placement of the high pressure pump is between the condenser 122 and the liquid store 124. The high pressure created in the liquid store is relieved according to the need for chilling or work through the nozzle.

If extra chill is required for condensation, the liquid in the liquid store 124 can be cooled cryogenically. An external heat pump may draw heat out from the store, chilling the store to a temperature of less than −40° C. The external heat pump can be operated using electricity from off-peak hours. The super-chilled working fluid provides another source of chill for liquefying the working fluid.

The work needed for the super-chilling the working fluid improves the efficiency of the heat engine. Heating from a wry low temperature to a high temperature can provide extra motive force for the turbine.

This completes an overall view of the entire system. Next we will examine more details of some of the subsystems.

Figure 2:
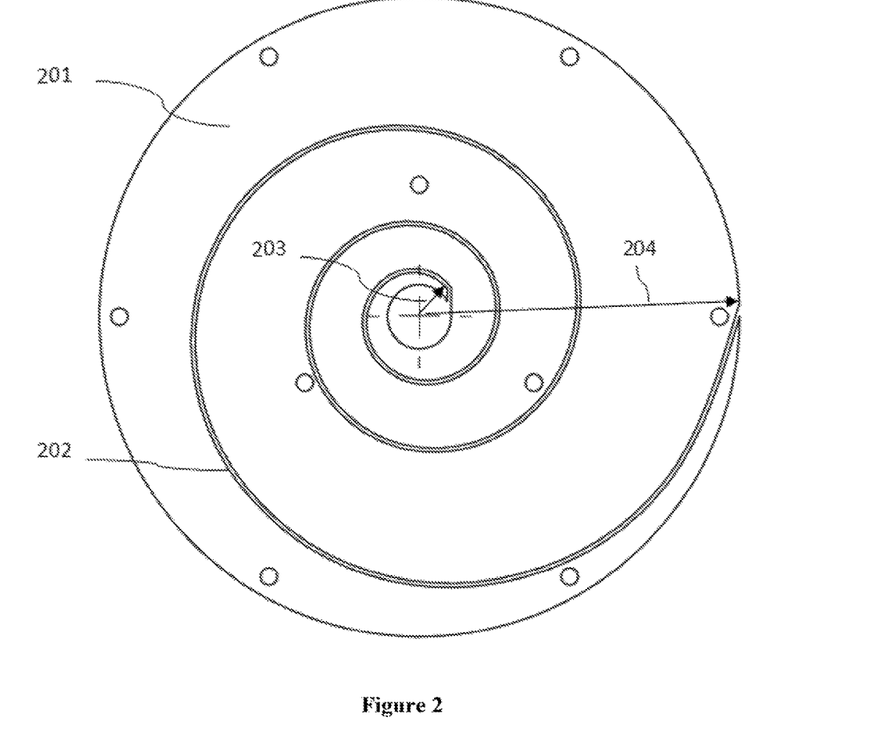
FIG. 2 illustrates the Hui turbine for electricity generation as per an embodiment of the present invention.

FIG. 2 shows a Hui turbine with an exponential spiral. The disk 201 has a single exponential spiral 202 with 3 turns. An exponential spiral has the equation $r(\theta)=a+be^{c\theta}$. The constants a, b, and c are affixed by the design of the initial radius 203, final radius 204, and the number of turns in between.

The exponential spiral has many beneficial properties suitable for our turbine. First, the spiral is self-similar, i.e. an infinite inward spiral looks the same when zoomed into the center of the spiral. This self-similarity has the property that the flight path of the gas is at the same constant angle relative to the tangent of the spiral where the gas is.

In the actual implementation, we use a 10 turn spiral with a spiral equation $r(\theta)=10^{\theta/20\pi}$ for $0 \leq \theta \leq 20\pi$. The radius has the range $0 \text{ cm} \leq r(\theta) \leq 10$ cm. The length of the spiral is around 1 m long, with a depth of 1 cm and a width of around 1 mm.

Multiple of these disk could be stacked to provide more motive force from a larger flow of the working fluid.

The rotor of a three phase AC generator is integrated into the turbine without using an external pinion linking the motive force of the turbine to an external generator.

Figure 3:
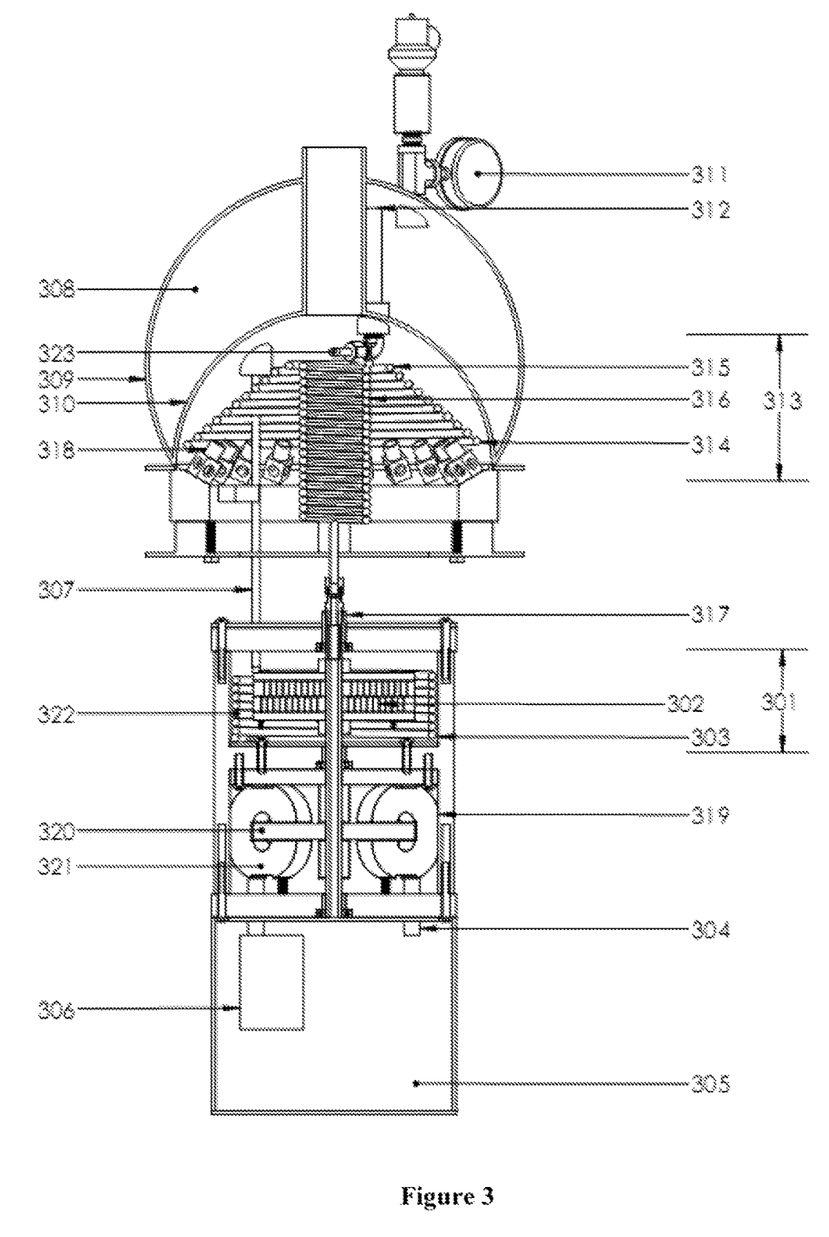
FIG. 3 illustrates the heating of the working fluid with use for work and electricity as per an embodiment of the present invention.

The entire Rankine Cycle for the gas turbine excluding the heat pump is shown in FIG. 3. It comprises the 4 steps of pumping, heating, working, and condensing of the gas. We assume the use of water as the working fluid in the following description.

The turbine 301, with spiral cross sections seen as vertical lines 302, is housed in a case 303 to contain the exiting gas from the side of the turbine. The condensing steam is then passed through cooling pipes 304 to a sump 305 for holding the condensed water.

A high pressure and low volume pump 306 is used to transport water up the pipe 307 into the boiler 308. Prior to entering the boiler, this water is preheated by the exiting gas from the turbine inside the turbine case, as water is circulating in the coils of the heat exchanger 322.

The turbine case, while containing the exiting gas, also serves as a heat exchanger. The heat exchanger raises the efficiency of the turbine. The high pressure pump raises the pressure of the boiler to Pi. In our implementation of the boiler, water is contained within the upper hemispheric shell 309 and a smaller lower hemispheric shell 310.

The pressurized water boils within the boiler 308 at an elevated boiling temperature, producing saturated steam. At 20 atmospheres of pressure, water boils at around 200 degree Celsius. The sensor 311 measures the temperature and pressure of the saturated steam from the boiler. The saturated steam exits the boiler at the outlet 312.

This saturated steam is carried by at tube to the bottom of a superheating coil 313 (comprising the coil sections 314 315 316). Steam circulates downward from the boiler through 323 to the bottom of the superheating coil at 314 through a tube (not shown in the cross section view). From the bottom 314 steam moves up to reach the smaller diameter 315.

At the top 315, steam becomes superheated beyond its boiling temperature. To further superheat the steam to a temperature, steam flows down the cylindrical coil 316, bringing the gas inlet temperature up to as high as 500 degrees Celsius. Steam now flows down towards the nozzle and inlet 317. The superheated and highly pressurized gas then performs work as gas passes through the spirals 302, thus completing the 4 steps of the Rankine heat engine cycle.

The heat source in FIG. 3 is assumed to be an open fire from burning a gaseous fossil fuel at the furnace nozzles 318. In another realization, the heat source is at the focal point of a parabolic mirror. We believe thermal generation of electricity can have a higher efficiency than photovoltaic generation.

High temperature heat is conducive to producing high quality kinetic energy from the turbine, which is then converted to electricity through the electric generator 319. The generator comprises the rotor 320 and the stator 321. The residual heat can be used for heating, evaporative cooling, and water purification.

The rotation of the turbine changes the trajectory of gas flow, as gas is confined within the rotating spiral. Consider first a stationary turbine. No work is performed by the gas on the turbine. Due to the significant impedance of the spiral, the gas is forced to turn constantly through the many turns of the spiral. This impedance is due to spiraling of the gas flow keeping pressure high until the outlet. Pressure is suddenly released, resulting in a sudden acceleration of the gas. In experiments, a loud hissing sound is heard. Upon exit, the accelerated gas rapidly loses its kinetic energy to the ambient static air.

The gas flow causes a reaction by the turbine, making the turbine rotate in a reversed direction of the gas flow spiral. The motion of gas relative to a stationary observer becomes less circuitous, making the gas flow path somewhat straightened by the reverse motion of the turbine. There is a certain velocity $\omega^{max}$ of turbine spin when the gas appears to the stationary observer as not spinning. The gas appears to make a relatively straight travel from the center to outside of the turbine. To the outside observer, the gas makes a beeline exit from inlet to outlet, with most of the pressure of the gas relieved close to the inlet.

To illustrate this path straightening, let us assume that the gas spins at a constant angular velocity of $\omega_g$ relative to the spinning turbine. Let the turbine spin at a constant angular velocity of $\omega_t$ relative to a stationary observer. Subsequently, the angular velocity of the gas relative to the stationary observer is $\omega = \omega_g - \omega_t$. The angular velocity of the turbine reduces the angular velocity of the gas seen from the ground.

To illustrate the effectiveness of the Hui turbine, consider the velocity of spinning of the gas is equal but in opposite direction to that of the turbine. The velocity of the gas is reduced by as factor of two. The kinetic energy of the gas is then reduced by a factor of 4. Most of the energy of the gas, as much as fact 75% of the gas, is imparted to the turbine.

Steam could be easily condensed inside the LOTUS ICE. In the likely scenario that carbon dioxide is used as the working fluid, extra chilling is needed to condense carbon dioxide.

Carbon dioxide becomes critical at a pressure of 74 bars and 33 degree Celsius. If keep pressure post turbine at a high 100 bars, carbon dioxide could condense at room temperature.

Unless pressure pre-turbine is very high, saying 500 to 1000 bar, having a high pressure post-turbine could significantly reduce the amount of work extracted from the turbine.

An external chiller may be used to bring the temperature of carbon dioxide down to less than $-40°$ C. The chiller would be coupled to the cooling system, FIREFLY ICE, and a channel for inserting a coil for evaporation, or other cooling, would be sent into the condenser to further cool the liquid store of refrigerant. At that low temperature, carbon dioxide becomes a liquid at a pressure of only 10 bars. If the working fluid started at a moderately high pressure of 100 bars, relieving gas pressure by the turbine to 10 bars can allow much work to be generated.

Use of an external chiller has many advantages. We do not have to compress the high pressure carbon dioxide directly and inline. Second, off-peak electricity can be cost effective for chill generation, storage, and use. We do not have to use electricity generated during peak hours for the Rankine cycle.

Third, the large range of temperature of the heat energy means a higher heat to work conversion efficiency.

This completes this description of the tri-generation method.

I claim:

1. A combined engine for the generation of electricity, heat, and cooling, said combined engine comprising:
   an electric generator comprising:
      A heat source providing heat to a refrigerant, said refrigerant contained within a closed system;
      tubing coupled to a generator and containing said refrigerant; and
      an exhaust outlet coupled to said generator adapted to direct said refrigerant exiting said electric generator to a heat engine;
   said heat engine comprising:
      an inlet adapted to receive said refrigerant exiting said electric generator;
      a channel adapted to receive said refrigerant and pass said refrigerant past a tank, adapted to allow heat to transfer from said refrigerant to a substance stored with said tank;
      said tank comprising:
         a tank entry adapted to allow supply of said substance into said tank; and
         a tank exit adapted to allow removal of said substance from said tank; and
      a heat outlet adapted to direct refrigerant from said inlet to a cooling system;
   said cooling system comprising:
      a receiver adapted to allow refrigerant to enter said cooling system from said heat engine heat outlet;
      a condenser adapted to transfer heat from said refrigerant to an evaporator; and
      said evaporator comprising an evaporator outlet coupled to a return tube adapted to return said refrigerant to said electrical generator.

2. The combined engine of claim 1, wherein said heat source comprises natural gas.

3. The combined engine of claim 1, wherein said heat source is solar energy.

4. The combined engine of claim 1 wherein said return tube is coupled to said heat engine.

5. The combined engine of claim 4, wherein said substance comprises water to be heated in said heat engine, and said heat engine provides a source of heated water.

6. The combined engine of claim 1 wherein said generator comprises a turbine from the production of electricity from kinetic energy contained within said refrigerant.

7. The combined engine of claim 1 wherein said cooling system condenser further comprises a store of liquid refrigerant.

8. The combined engine of claim 7 further comprising a chiller coupled to said cooling system adapted to provide chill to said store.

9. The combined engine of claim 1 wherein said refrigerant comprises ammonia.

10. The combined engine of claim 1 wherein said refrigerant is subjected to pressure and temperature to achieve supercritical status.

11. The combined engine of claim 10 wherein said refrigerant comprises carbon dioxide.

12. The combined engine of claim 11 wherein said refrigerant consists of carbon dioxide.

13. The combined engine of claim 10 wherein said refrigerant is paired with hydrogen gas.

14. A method for the generation of electricity, heat, and cooling, said method comprising the steps of:
supplying heat to a refrigerant, the refrigerant contained within a closed loop;
directing the refrigerant past a generator and then to an exhaust;
directing the refrigerant from the exhaust to a heat engine;
transferring heat from the refrigerant to a liquid within a tank;
directing the refrigerant from the heat engine to a condenser within a cooling system;
pumping the refrigerant from the condenser to an evaporator and evaporating the refrigerant to cool refrigerant in the condenser;
returning the refrigerant to the heat supply;
providing chill from an external chiller coupled to the cooling system to the condenser to further cool the refrigerant.

15. A method for the generation of electricity, heat, and cooling, said method comprising the steps of:
supplying heat to a refrigerant, the refrigerant contained within a closed loop;
directing the refrigerant past a generator and then to an exhaust;
directing the refrigerant from the exhaust to a heat engine;
transferring heat from the refrigerant to a liquid within a tank;
directing the refrigerant from the heat engine to a condenser within a cooling system;
pumping the refrigerant from the condenser to an evaporator and evaporating the refrigerant to cool refrigerant in the condenser; and
returning the refrigerant to the heat supply, wherein said step of returning draws the refrigerant past the heat engine prior to returning to the heat supply.

16. The method of claim 15, wherein said refrigerant is ammonia.

17. The method of claim 15, wherein said step of supplying heat provides for a temperature and pressure system in which the refrigerant achieves supercritical fluid status.

18. The method of claim 17, wherein said refrigerant is carbon dioxide.

19. The method of claim 18, wherein said refrigerant is combined with hydrogen gas in the closed loop, and the hydrogen gas is sequestered so as not to be directed to the heat engine.

* * * * *